(12) United States Patent
Ghosh et al.

(10) Patent No.: US 11,330,075 B2
(45) Date of Patent: *May 10, 2022

(54) ONE-TIME CACHE

(71) Applicant: Akamai Technologies, Inc., Cambridge, MA (US)

(72) Inventors: Koushik Ghosh, Mountain View, CA (US); Hariharan Kolam, Palo Alto, CA (US); Raghu Batta Venkat, Sunnyvale, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/399,563

(22) Filed: Apr. 30, 2019

(65) Prior Publication Data

US 2019/0260848 A1    Aug. 22, 2019

Related U.S. Application Data

(63) Continuation of application No. 15/247,594, filed on Aug. 25, 2016, now Pat. No. 10,320,934.

(Continued)

(51) Int. Cl.
| | | |
|---|---|---|
| *G06F 15/167* | (2006.01) | |
| *H04L 67/5681* | (2022.01) | |
| *H04L 67/02* | (2022.01) | |
| *H04L 67/01* | (2022.01) | |
| *H04L 67/565* | (2022.01) | |
| *H04L 67/53* | (2022.01) | |
| *H04L 67/5682* | (2022.01) | |
| *H04L 69/22* | (2022.01) | |

(52) U.S. Cl.
CPC .......... *H04L 67/2847* (2013.01); *H04L 67/02* (2013.01); *H04L 67/20* (2013.01); *H04L 67/2823* (2013.01); *H04L 67/2852* (2013.01); *H04L 67/42* (2013.01); *H04L 69/22* (2013.01)

(58) Field of Classification Search
CPC ..... H04L 67/2847; H04L 67/02; H04L 67/20; H04L 67/2823; H04L 67/2852; H04L 67/42; H04L 69/22
USPC .................................. 709/203, 223, 213, 214
See application file for complete search history.

(56) References Cited

U.S. PATENT DOCUMENTS

| | | | |
|---|---|---|---|
| 6,067,565 A * | 5/2000 | Horvitz | ................... H04L 29/06 709/218 |
| 6,085,193 A | 7/2000 | Malkin | |

(Continued)

*Primary Examiner* — Thu Ha T Nguyen
(74) *Attorney, Agent, or Firm* — David H. Judson

(57) ABSTRACT

A method of delivering dynamic web content by a proxy server is disclosed. A plurality of responses to requests for dynamic web content at a URL (uniform resource locator) is prefetched by a proxy server from an origin server. The plurality of prefetched responses is cached by the proxy server in a one-time cache, wherein each prefetched response cached in the one-time cache is served at most once and then removed from the one-time cache. A request from a client device for the dynamic web content at the URL is received by the proxy server. One of the plurality of prefetched responses cached in the one-time cache is served by the proxy server to the client device, wherein the one of the plurality of prefetched responses is removed from the one-time cache after the one of the plurality of prefetched responses has been served.

27 Claims, 10 Drawing Sheets

Related U.S. Application Data

(60) Provisional application No. 62/209,725, filed on Aug. 25, 2015.

(56) References Cited

U.S. PATENT DOCUMENTS

| | | | |
|---|---|---|---|
| 6,389,460 B1 * | 5/2002 | Stewart | G06K 9/222 709/217 |
| 6,463,508 B1 | 10/2002 | Wolf | |
| 6,807,558 B1 * | 10/2004 | Hassett | G09F 27/00 709/203 |
| 6,874,017 B1 * | 3/2005 | Inoue | H04L 12/189 709/217 |
| 6,941,338 B1 * | 9/2005 | Madsen | H04L 67/2819 709/203 |
| 6,959,318 B1 | 10/2005 | Tso | |
| 6,976,090 B2 | 12/2005 | Ben-Shaul | |
| 7,039,672 B2 | 5/2006 | Wu | |
| 7,130,890 B1 | 10/2006 | Kumar | |
| 7,133,904 B1 * | 11/2006 | Sohya | H04L 67/2823 709/218 |
| 7,359,985 B2 * | 4/2008 | Grove | H04L 29/12018 709/218 |
| 7,613,815 B1 * | 11/2009 | Prakash | H04L 67/28 707/999.1 |
| 7,707,271 B2 * | 4/2010 | Rudkin | H04L 65/605 370/401 |
| 7,975,025 B1 * | 7/2011 | Szabo | G06F 16/9574 709/218 |
| 8,078,759 B2 * | 12/2011 | Seifert | H04L 67/2804 709/246 |
| 8,195,763 B2 * | 6/2012 | Knowles | H04L 9/12 709/217 |
| 8,321,533 B2 | 11/2012 | Fainberg et al. | |
| 8,447,837 B2 | 5/2013 | Devanneaux et al. | |
| 8,788,581 B2 * | 7/2014 | Sundarrajan | G06F 16/9574 709/203 |
| 8,832,228 B2 | 9/2014 | Luna | |
| 8,874,761 B2 | 10/2014 | Backholm | |
| 8,892,720 B2 * | 11/2014 | Diaz | H04L 12/40013 709/224 |
| 8,984,048 B1 * | 3/2015 | Maniscalco | H04L 67/10 709/203 |
| 9,106,607 B1 | 8/2015 | Lepeska | |
| 9,402,114 B2 * | 7/2016 | Gahm | H04N 21/8451 |
| 9,477,774 B2 | 10/2016 | Conboy et al. | |
| 9,516,078 B2 * | 12/2016 | Catchpole | H04L 65/605 |
| 9,613,158 B1 * | 4/2017 | Lepeska | G06F 16/9574 |
| 9,639,629 B1 | 5/2017 | Venkat | |
| 9,813,480 B2 | 11/2017 | Kolam | |
| 9,948,709 B2 | 4/2018 | Holland et al. | |
| 10,009,439 B1 | 6/2018 | Kolam | |
| 10,225,365 B1 * | 3/2019 | Hotchkies | H04L 67/2842 |
| 10,630,771 B1 * | 4/2020 | Garza | H04L 67/1095 |
| 2003/0177396 A1 | 9/2003 | Bartlett | |
| 2003/0195940 A1 * | 10/2003 | Basu | G06F 16/9574 709/213 |
| 2004/0198395 A1 * | 10/2004 | Kimoto | H04L 67/04 455/456.1 |
| 2005/0097085 A1 | 5/2005 | Shen | |
| 2007/0174428 A1 * | 7/2007 | Lev Ran | H04L 67/06 709/218 |
| 2007/0244987 A1 * | 10/2007 | Pedersen | H04L 67/06 709/217 |
| 2008/0010410 A1 * | 1/2008 | Zilbershtein | H04L 67/06 711/118 |
| 2008/0229017 A1 * | 9/2008 | Plamondon | H04L 67/2847 711/118 |
| 2008/0229020 A1 * | 9/2008 | Plamondon | H04L 67/2847 711/122 |
| 2008/0229021 A1 * | 9/2008 | Plamondon | H04L 67/2847 711/125 |
| 2008/0229023 A1 * | 9/2008 | Plamondon | H04L 67/28 711/126 |
| 2008/0229024 A1 | 9/2008 | Plamondon | |
| 2008/0229025 A1 | 9/2008 | Plamondon | |
| 2009/0100228 A1 | 4/2009 | Lepeska | |
| 2009/0293000 A1 | 11/2009 | Lepeska | |
| 2010/0142516 A1 * | 6/2010 | Lawson | H04M 7/0021 370/352 |
| 2010/0146415 A1 * | 6/2010 | Lepeska | H04L 29/00 715/760 |
| 2010/0180082 A1 | 7/2010 | Sebastian | |
| 2010/0235473 A1 * | 9/2010 | Koren | H04W 4/50 709/219 |
| 2012/0209942 A1 | 8/2012 | Zehavi | |
| 2012/0278439 A1 * | 11/2012 | Ahiska | A63F 13/358 709/218 |
| 2013/0097309 A1 * | 4/2013 | Ma | H04L 29/08099 709/224 |
| 2013/0124621 A1 | 5/2013 | Lepeska | |
| 2013/0159074 A1 * | 6/2013 | Chavan | G06Q 30/0241 705/14.4 |
| 2013/0178195 A1 * | 7/2013 | Luna | H04W 24/04 455/414.1 |
| 2013/0340043 A1 * | 12/2013 | Zarei | G06F 21/31 726/4 |
| 2014/0189069 A1 * | 7/2014 | Gero | H04L 67/2833 709/219 |
| 2014/0379840 A1 | 12/2014 | Dao et al. | |
| 2015/0012608 A1 | 1/2015 | Ishikawa | |
| 2015/0012614 A1 * | 1/2015 | Kolam | G06F 16/954 709/218 |
| 2015/0032803 A1 | 1/2015 | Graham-Cumming | |
| 2015/0120821 A1 | 4/2015 | Bendell | |
| 2016/0182923 A1 * | 6/2016 | Higgs | H04N 21/23424 725/34 |
| 2016/0226998 A1 | 8/2016 | Holland et al. | |
| 2016/0323409 A1 * | 11/2016 | Kolhi | H04L 61/1511 |
| 2016/0380975 A1 | 12/2016 | Reddy | |
| 2017/0026483 A1 * | 1/2017 | Ruellan | H04L 67/2842 |
| 2017/0289593 A1 * | 10/2017 | Li | H04N 21/23106 |
| 2018/0160156 A1 * | 6/2018 | Hannuksela | H04N 21/8456 |
| 2018/0181409 A1 | 6/2018 | Han | |
| 2018/0287960 A1 * | 10/2018 | Huang | H04L 67/2842 |

* cited by examiner

```html
<html>
  <head>
    <title>Welcome</title>
  </head>
  <body>
    <h1>HelloWorld </h1>
      .
      .
      .
    <img src = "url for image"/>
    <video>
        <source src = "url for video" type = "video/ogg"  />
    </video>
    <script type = "text/javascript">
    <!--script
    *** Some javascript code is placed here ***
    -- >
    </script>

</body>
</html>
```

Script

ONE-TIME CACHE

CROSS REFERENCE TO OTHER APPLICATIONS

This application is a continuation of co-pending U.S. patent application Ser. No. 15/247,594, entitled ONE-TIME CACHE, filed Aug. 25, 2016, which claims priority to U.S. Provisional Patent Application No. 62/209,725, entitled ONE-TIME CACHE, filed Aug. 25, 2015, both of which are incorporated herein by reference for all purposes.

BACKGROUND OF THE INVENTION

Traditionally, by caching content such as webpages or webpage components close to a requestor of the content, the content can be quickly retrieved from the cache rather than the origin server, saving bandwidth and time. However, caching is of limited value when the requested content is dynamic. Typically, when at least a portion of the content in a webpage is dynamic, the webpage is treated as non-cacheable, and therefore needs to be retrieved from the origin server in response to a request from a user. During the longer retrieval time, the web browser is idling and waiting for the HTTP response to its HTTP request, and the web browser is blocked from downloading any resources. Therefore, improved techniques for delivering information are desirable.

BRIEF DESCRIPTION OF THE DRAWINGS

Various embodiments of the invention are disclosed in the following detailed description and the accompanying drawings.

FIG. 2 is a diagram illustrating an embodiment of a webpage 200 described by an HTML file.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
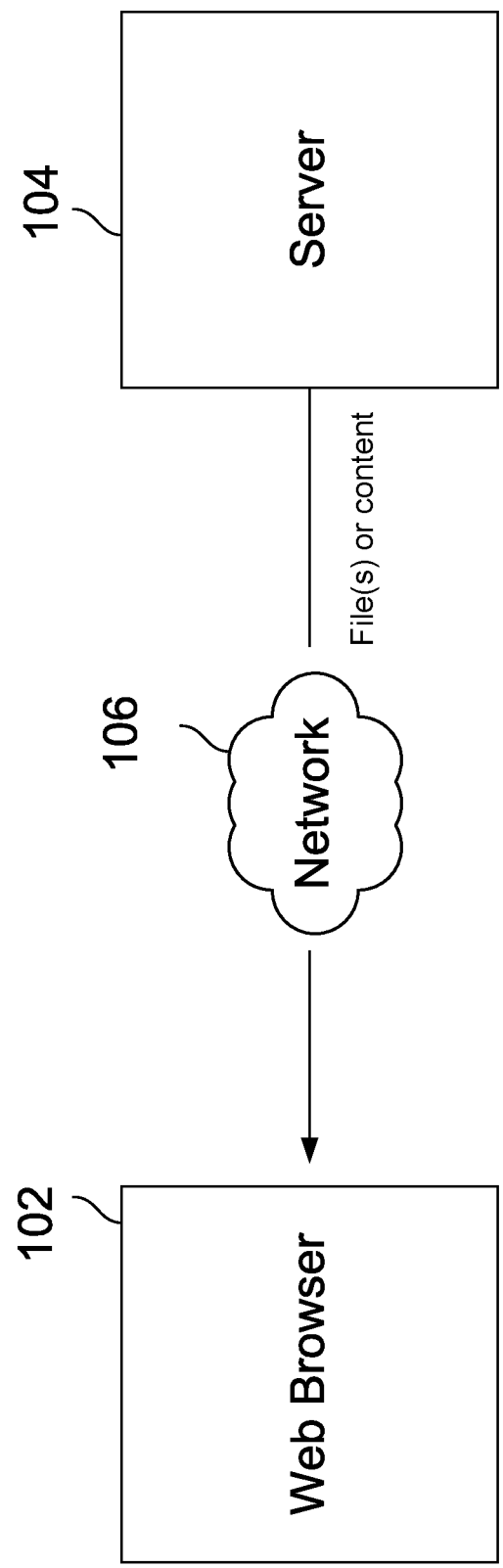
FIG. 1 is a block diagram illustrating an embodiment of a web browser running a web application.

FIG. 1 is a block diagram illustrating an embodiment of a web browser running a web application. The web browser accesses webpages and other information through a network. As shown in FIG. 1, a web browser 102 is connected to a server 104 (e.g., an edge server) through a network 106. Network 106 may be any combination of public or private networks, including intranets, local area networks (LANs), wide area networks (WANs), radio access networks (RANs), Wi-Fi networks, the Internet, and the like. Web browser 102 may run on different types of devices, including laptop computers, desktop computers, tablet computers, smartphones, and other mobile devices.

A webpage accessed by web browser 102 may be described by different markup languages, including Hypertext Markup Language (HTML), Extensible Markup Language (XML), and the like. The webpage may be described by other custom languages as well. HTML is used hereinafter as an example of the various languages for describing webpages. Note that the examples of HTML are selected for illustration purposes only; accordingly, the present application is not limited to these specific examples.

FIG. 2 is a diagram illustrating an embodiment of a webpage 200 described by an HTML file. To display the webpage, web browser 102 sends a Hypertext Transfer Protocol (HTTP) request message to server 104 requesting the HTML webpage file. After server 104 locates the requested HTML webpage file, server 104 returns the requested HTML webpage file in an HTTP response message to web browser 102. As web browser 102 begins to render the webpage on a screen, web browser 102 parses the received webpage file and builds a data structure to represent the various components of the webpage in a local memory.

The Document Object Model (DOM) is a standardized model supported by different web browsers, e.g., Internet Explorer, Firefox, and Google Chrome, for representing the various components of a webpage. The DOM is a cross-platform and language-independent convention for representing and interacting with objects in HTML documents as well as XHTML and XML documents. Objects in a DOM tree may be addressed and manipulated using methods on the objects. The public interface of a DOM is specified in its application programming interfaces (APIs), known as the DOM APIs.

The DOM standard includes different levels. DOM core level 0 and level 1 are the core standards supported by all web browsers. DOM levels 2 and above are extensions to DOM core level 0 and level 1, which can be optionally supported by different web browsers. DOM core level 0 and level 1 define a minimal set of objects and interfaces for accessing and manipulating document objects. The DOM provides a complete model for an entire HTML document, including the means to change any portion of the document.

The DOM standard represents documents as a hierarchy of node objects, called a DOM tree. Within the document structure hierarchy, some types of nodes may have child nodes of various types, while other nodes are leaf nodes that cannot have any object below them.

Figure 3:
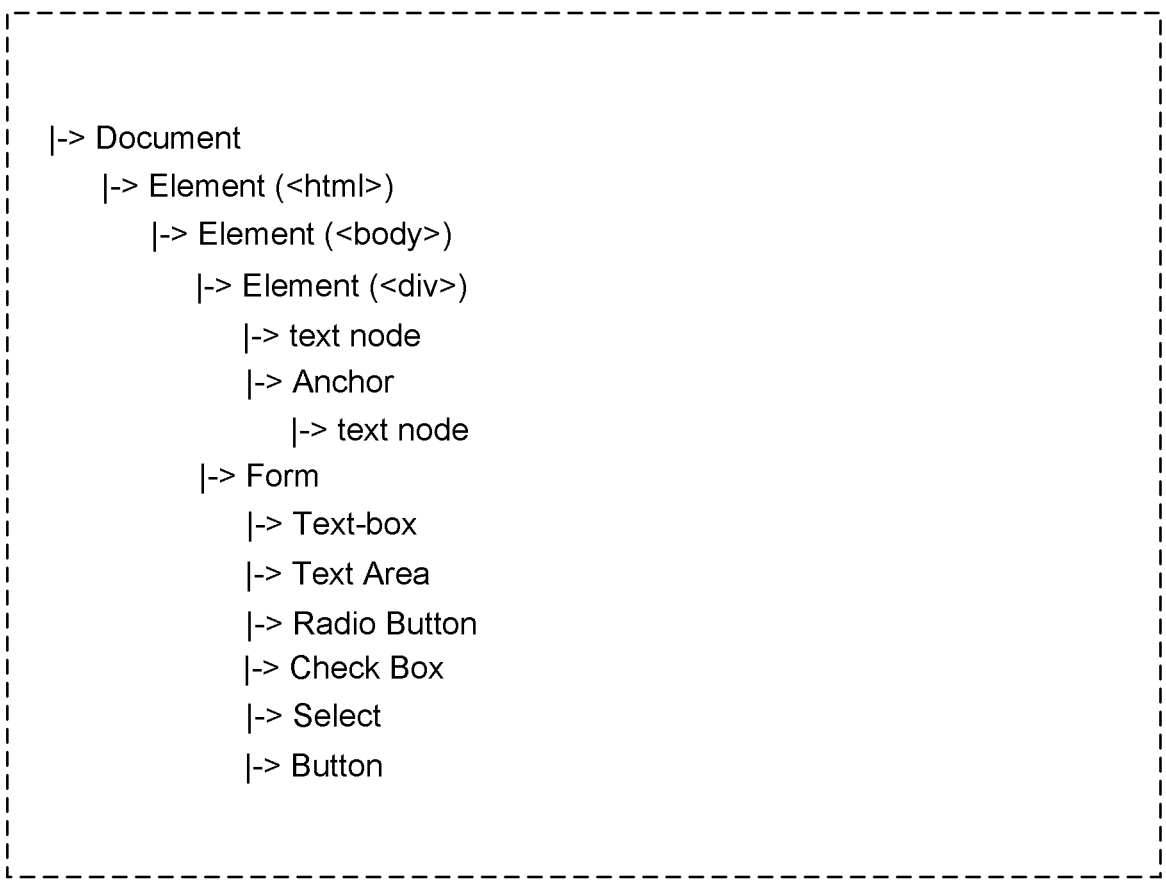
FIG. 3 is a diagram illustrating an embodiment of a DOM tree 300.

FIG. 3 is a diagram illustrating an embodiment of a DOM tree 300. As shown in FIG. 3, the topmost node, or root, of DOM tree 300 is the document object. A document object represents an entire HTML (or XML) document, and it provides the primary access to the document's data. The element object represents an element in the HTML document. Other types of nodes in the DOM tree may include text nodes, anchors, text-boxes, text areas, radio buttons, check boxes, selects, buttons, and the like.

With continued reference to FIG. 2, when web browser 102 renders webpage 200 on a screen, web browser 102 parses the received HTML webpage file and builds a DOM tree to represent the various components of webpage 200 in a local memory. For example, when the image tag (shown as <img src="url for image"/> in FIG. 2) is parsed by web browser 102, the image is represented as an image object, and the image object is accordingly inserted into the DOM tree.

After the webpage file is parsed and the corresponding DOM tree is created, the entire DOM tree can be traversed to retrieve any dependent resources (e.g., images, JavaScripts, audio clips, or videos) indicated by any of the nodes in the DOM tree via a network. For example, the image object corresponding to the image tag in webpage 200 redirects web browser 102 to fetch an image file from an uniform resource locator (URL). Accordingly, web browser 102 sends a request via a network, requesting the image resource to be downloaded. There are two ways a request may be issued: statically, in which case it is the browser which manipulates the DOM; or dynamically, in which case the DOM manipulation is done by JavaScript. In response to the request, the requested dependent resource is sent to web browser 102 via a network.

A web application may include scripts that are executed when different DOM events occur. DOM event APIs allow event-driven programming languages (e.g., JavaScript, Jscript, ECMAScript, VBScript, and Java) to register various DOM event handlers/listeners with the element nodes inside a DOM tree. Different types of events can be generated by the element nodes inside a DOM tree, including mouse events, keyboard events, HTML frame/object events, HTML form events, user interface events, mutation events, progress events, and the like. For example, the DOM event API "onclick" is triggered when a user clicks on an element, and a script that has registered as a callback script for the "onclick" event will be executed. In another example, the DOM event APIs "onKeyDown" and "onKeyup" are triggered when a user presses a key and releases a key, respectively. In another example, the DOM event API "oninput" is triggered when an element receives user inputs.

Figure 4:
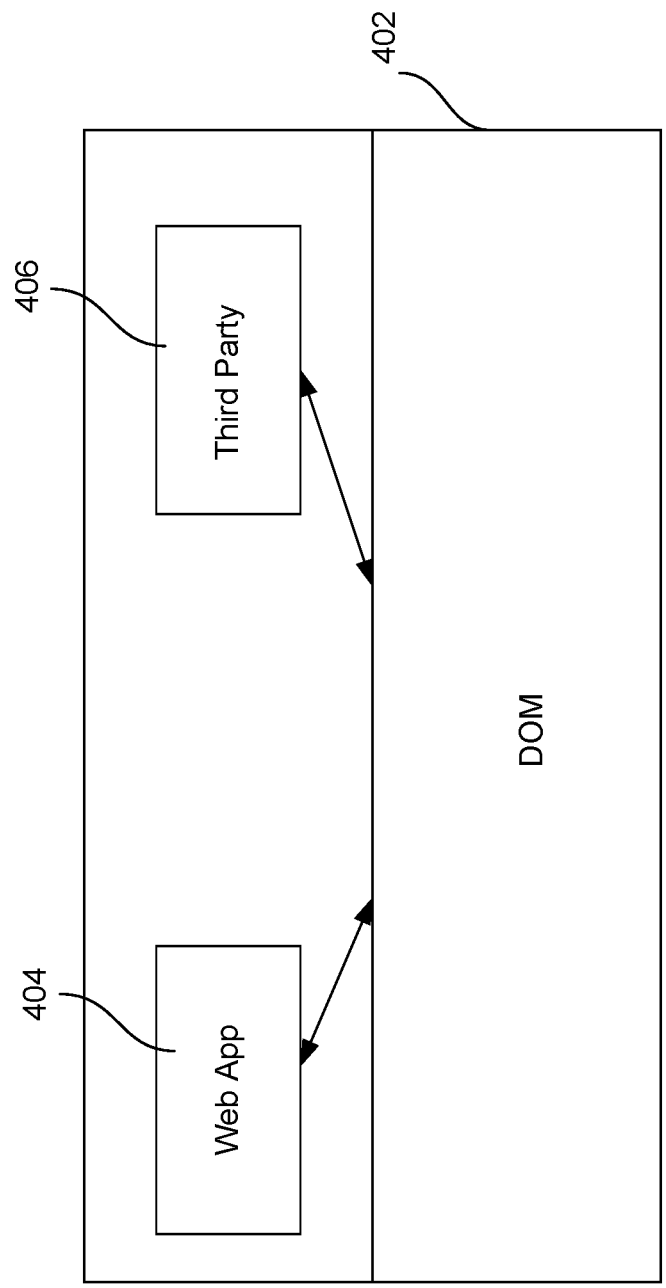
FIG. 4 illustrates that the DOM 402 may be accessed by a web application 404 and its scripts, and also by any legitimate third-party scripts, code or libraries (406).

FIG. 4 illustrates that the DOM 402 may be accessed by a web application 404 and its scripts, and also by any legitimate third-party scripts, code or libraries (406).

With continued reference to FIGS. 1 and 2, since the network latency associated with different types of networks varies widely, and web browser 102 needs to receive webpage 200 and its dependent resources before web browser 102 can complete the rendering of webpage 200, the startup wait time experienced by the end-user of the browsing session may be insignificant in low-latency networks, but unacceptably long for an end-user in higher-latency networks. Traditionally, by caching content such as webpages or webpage components close to the requestor of the content, the content can be quickly retrieved from the cache rather than the origin server, saving CDN bandwidth and time. However, caching is of limited value when the requested content is dynamic. Typically, when at least a portion of the content in a webpage is dynamic, the webpage is treated as non-cacheable, and therefore needs to be retrieved from the origin server in response to a request from a user. During the longer retrieval time, the web browser is idling and waiting for the HTTP response to its HTTP request, and the web browser is blocked from downloading any resources. Therefore, improved techniques for delivering information are desirable.

In the present application, an improved technique for delivering dynamic webpages is disclosed. The technique is herein also referred to as one-time caching (OTC). Briefly, using one-time caching, certain types of responses to requests for dynamic webpages or other web resources may be prefetched from an origin server and pre-populated in an OTC cache ahead of time, thereby reducing web browser latency and improving the end-user's overall experience. Unlike in regular caches, each cached response stored in the OTC cache may only be sent once in response to a single request and is thereafter removed from the OTC cache, as will be described in greater detail below.

Figure 5:
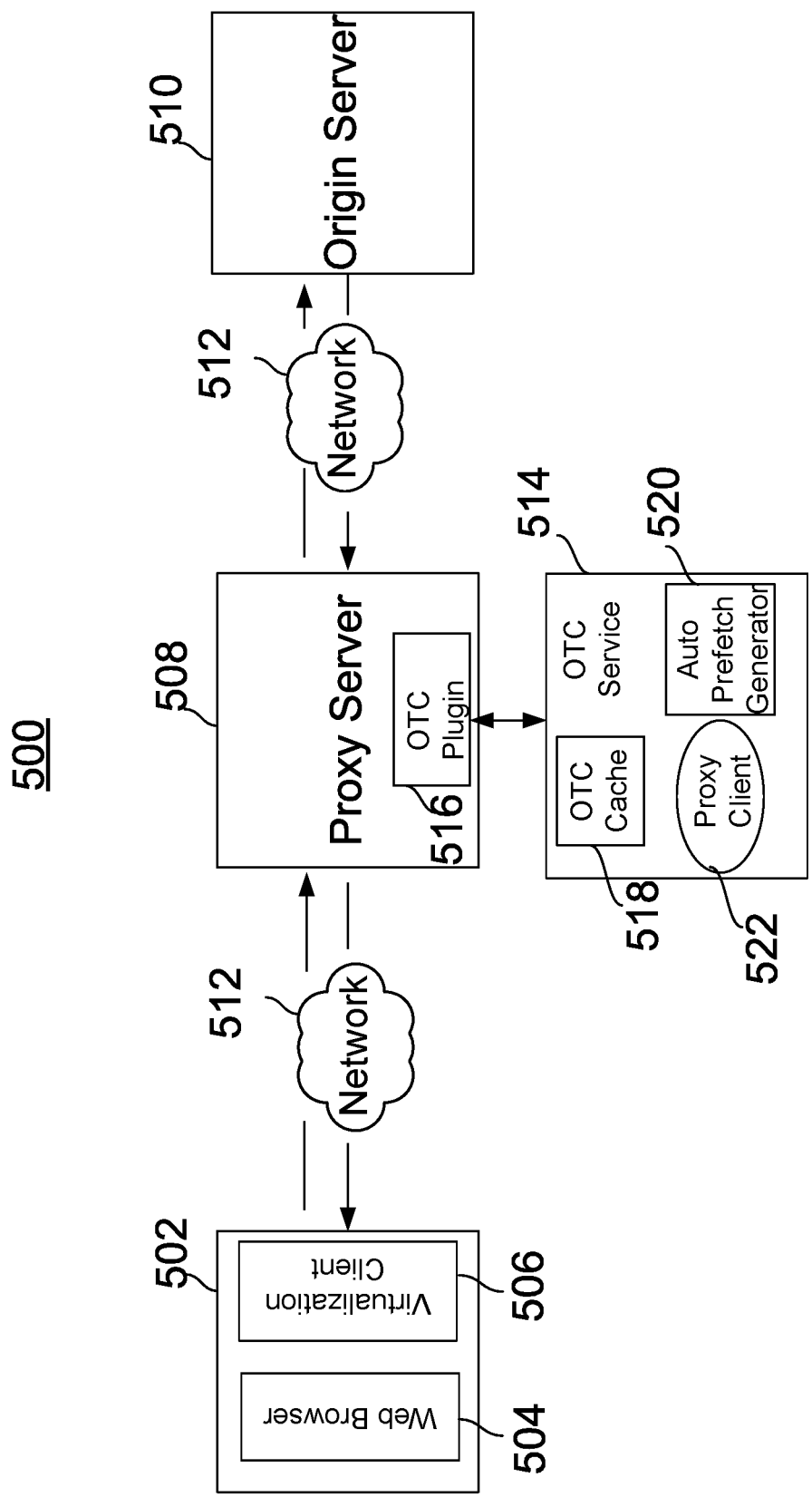
FIG. 5 is a block diagram illustrating an embodiment of an optimized content delivery environment for efficiently delivering dynamic webpages.

FIG. 5 is a block diagram illustrating an embodiment of an optimized content delivery environment for efficiently delivering dynamic webpages. Block diagram 500 illustrates a client device 502, a proxy server 508, and an origin server 510 communicating across networks 512. Networks 512 may be any combination of public or private networks, including intranets, local area networks (LANs), wide area networks (WANs), radio access networks (RANs), Wi-Fi networks, the Internet, and the like. In some embodiments, proxy server 508 is a server that belongs to a content delivery network or content distribution network (CDN). In some embodiments, origin server 510 is a web publisher. Examples of client device 502 include laptop computers, desktop computers, tablet computers, smartphones, and other mobile devices. Client device 502 includes a web browser 504. Examples of web browser 504 include Internet Explorer, Google Chrome, Mozilla Firefox, Safari, and the like. In some embodiments, client device 502 further includes an optional virtualization client 506. In some other embodiments, client device 502 does not include a virtualization client, but its tasks may be performed by scripts (e.g., JavaScript) provided by proxy server 508.

Block diagram 500 further illustrates an OTC service 514. As shown in FIG. 5, proxy server 508 is separated from OTC service 514, and proxy server 508 communicates with OTC service 514 via an OTC plugin 516. However, in other embodiments, proxy server 508 may be integrated with OTC service 514 as a single edge server. OTC service 514 includes a plurality of modules. In some embodiments, OTC service 514 includes an OTC cache 518, an automatic prefetch generator 520, and a proxy client 522.

One-time caching may be used to efficiently deliver certain types of responses to requests for dynamic webpages or other web contents. One type of dynamic content response that may be efficiently delivered by OTC is a non-personalized dynamic webpage. Dynamic content may be personalized for a particular user by detecting the particular user via IP tracking or by detecting in the HTTP request a cookie that is associated with the particular user. One example of a non-personalized dynamic resource is a webpage that is sent in response to a request without a cookie (also referred to as a no-cookie request). Webpages that contain non-personalized dynamic content may be home pages, landing pages, and login pages. A home page is the introductory page of a website, typically serving as a table of contents for the site. A landing page is a webpage that appears in response to clicking on a search engine optimized search result or an online advertisement. A login page is a webpage that allows users to get access to a website by identifying and authenticating themselves. Webpages that contain non-personalized dynamic content may also be search engine optimization (SEO) pages. Another example of non-personalized dynamic content includes API calls.

Figure 6:
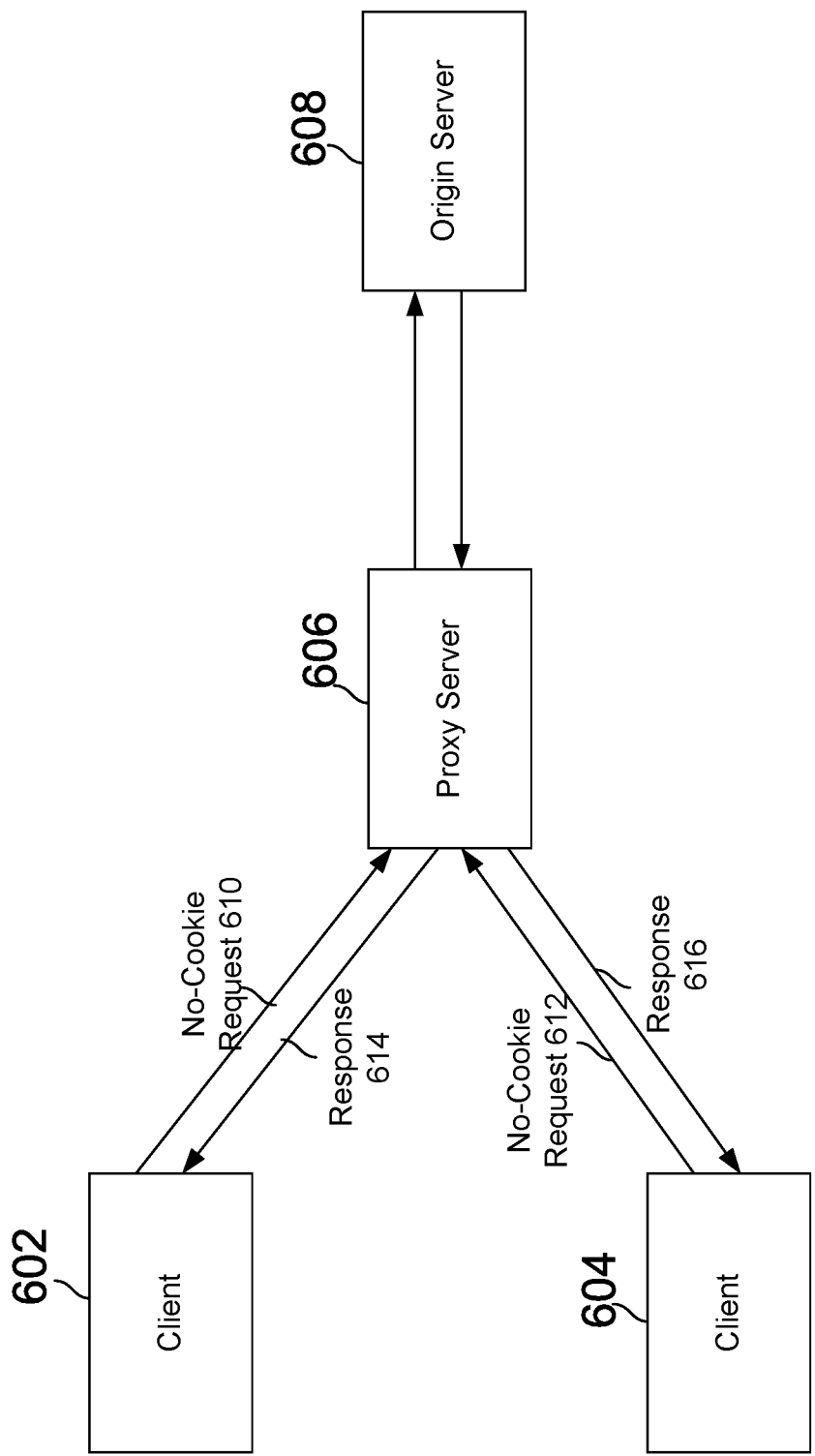
FIG. 6 illustrates an example of two clients (client 602 and client 604) using web browsers to send no-cookie HTTP requests (610 and 612) and receiving non-personalized HTTP responses (614 and 616) from origin server 608 via proxy server 606.

FIG. 6 illustrates an example of two clients (client 602 and client 604) using web browsers to send no-cookie HTTP requests (610 and 612) and receiving non-personalized HTTP responses (614 and 616) from origin server 608 via proxy server 606. For example, client 602 and client 604 each tries to access an online merchant's website for the very first time at about the same time. Since both clients have never visited the website before, neither of the requests sent by the two clients have any cookies. Had the no-cookie requests been forwarded by proxy server 606 to origin server 608 at about the same time, two scenarios would have occurred.

In the first scenario, identical HTTP responses would have been generated by origin server 608 for the two clients—response 614 for client 602 and response 616 for client 604. The two responses are identical because without any cookies in the requests, the HTTP responses are not personalized for the particular users. Since the two HTTP responses are identical, responses for client 602 and client 604 are interchangeable. For example, if the two no-cookie requests were sent and received at about the same time, then proxy server 606 could have sent response 614 to client 604 and response 616 to client 602 and achieve the same results.

In a second scenario, identical HTTP responses with different Set-Cookie HTTP headers would have been generated by origin server 608 for the two clients—response 614 (with cookie #1) for client 602 and response 616 (with cookie #2) for client 604. A Set-Cookie HTTP header instructs a web browser to store the cookie and send it back in future requests to the origin server, such that two different users may be differentiated from each other thereafter. As seen in this second scenario, each response with a Set-Cookie HTTP header is usable by a single user, but is not targeted to a particular user. Therefore, responses for client 602 and client 604 are interchangeable for near same time requests, just as in the first scenario. For example, if the two no-cookie requests were sent and received at about the same time, then proxy server 606 could have sent response 614 (with cookie #1) to client 604 and response 616 (with cookie #2) to client 602, while achieving the same results.

Leveraging the above described principle, a proxy server using one-time caching techniques prefetches non-personalized dynamic webpages from an origin server and pre-populates them in an OTC cache ahead of time, enabling non-personalized dynamic webpages to be sent quickly in response to no-cookie requests without forwarding the requests across networks to the origin server and waiting for responses to return from the origin server, thereby reducing latencies and improving the user's browsing experience. However, each cached response stored in the OTC cache may only be sent once in response to a single request and is thereafter removed from the OTC cache, such that the response (which may contain a cookie) cannot be sent a second time to a second user.

Figure 7:
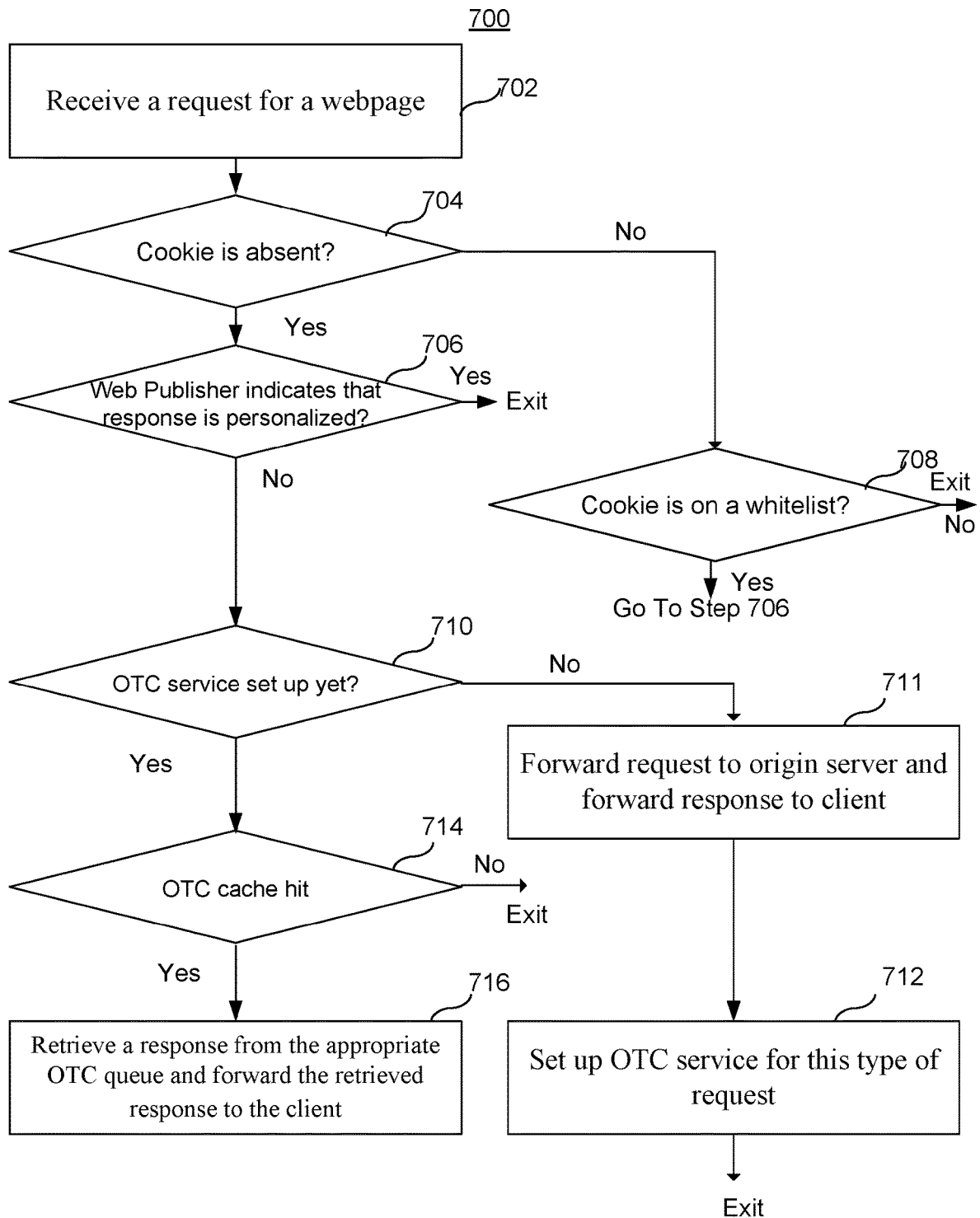
FIG. 7 illustrates an embodiment of a flow diagram of a process 700 for efficiently delivering dynamic webpages using OTC techniques.

FIG. 7 illustrates an embodiment of a flow diagram of a process 700 for efficiently delivering dynamic webpages using OTC techniques. In some embodiments, process 700 is performed by proxy server 508 and OTC service 514, as shown in FIG. 5. In some embodiments, proxy server 508 is separated from OTC service 514, and proxy server 508 communicates with OTC service 514 via an OTC plugin 516. In other embodiments, proxy server 508 is integrated with OTC service 514 as a single edge server.

At 702, proxy server 508 receives a HTTP request (may be a HTTPS or FTP request instead) for a webpage or web resource from a client. For example, a user tries to access a website at a URL (e.g., http://xyz.com) and web browser 504 of the user's client device 502 sends a HTTP request, which is received by proxy server 508.

After step 702, proxy server 508 determines whether the response to the received request may be served by OTC service using OTC techniques. One or more conditions may be checked to determine whether the response corresponding to the received request is dynamic and non-personalized and thus qualifies for OTC service.

At step 704, proxy server 508 determines whether the received request includes a cookie. If the received request does not include a cookie (i.e., a cookie is absent), then process 700 proceeds to step 706; otherwise, process 700 proceeds to step 708. At step 706, it has been determined that the received request does not include a cookie. Therefore, OTC may be used unless the configuration indicates that the response should not be delivered by OTC. For example, at step 706, it is determined whether the web publisher has specified via configurations that OTC should be disabled for the particular URL. There may be various reasons why a web publisher would decide to disable OTC for a particular URL. For example, a web publisher may track the users getting access to the URL based on IP tracking. In this case, the web publisher may send personalized information in response to a request that has no cookies in it, and therefore OTC should be disabled. At step 706, if the web publisher indicates (e.g., via configuration) that the response to the request is personalized and thus OTC should be disabled, then process 700 terminates, and the request is not processed further using OTC techniques. In particular, the request may be forwarded by proxy server 508 to origin server 510, and the response from origin server 510 will be forwarded by proxy server 508 to the client at a later time, bypassing OTC service. If the web publisher has not indicated (e.g., via configurations) that the response to the request is personalized, then OTC is not disabled according to the configurations, and process 700 proceeds to step 710, such that the request may be processed further using OTC techniques.

At step 708, it has been determined that the received request does include a cookie. Therefore, OTC should not be used unless the configuration indicates that the response should nevertheless be delivered by OTC. For example, at step 708, it is determined whether the web publisher has specified a whitelist of exempted cookies via configurations for the particular URL. There may be different reasons why a web publisher would decide to whitelist and ignore certain cookies for a particular URL. For example, a web publisher may use certain cookies for purposes other than personalizing the responses for different users. In this case, the web publisher may send non-personalized information in response to a request that has one of the special cookies in it. Using an exempted cookie whitelist, the web publisher may configure a list of exempted cookies for a particular URL, such that any cookie in a request that matches with the whitelist will be ignored and that OTC can be used to deliver the response.

At step 708, if the cookie in the request does not match with one of the exempted cookies on the whitelist, then process 700 terminates, and the request is not processed further using OTC techniques. In particular, the request may be forwarded by proxy server 508 to origin server 510, and the response from origin server 510 will be forwarded by proxy server 508 to the client at a later time, bypassing OTC service. If the cookie in the request matches with one of the exempted cookies on the whitelist, then process 700 proceeds to step 706.

At step 710, proxy server 508 determines whether OTC service has been set up for the current type of request and the corresponding type of response. OTC maintains separate queues (e.g., FIFO queues) in OTC cache 518 for storing responses that contain different content. Different webpages at different URLs contain different content. For example, the home page of one website has different content from the home page of another website. For a particular webpage at a particular URL, the content may also differ based on a number of client device attributes, including the geographic location from which the request originates, the language set by the client device, the client device type (e.g., desktop computers, smartphones, or tablet computers), the operating system used by the client device (e.g., Linux or Windows), the web browser type and its version (e.g., Google Chrome, Firefox, or Internet Explorer), and the like. Therefore, queues for different combinations of URLs and attributes may be created. Each queue is created and initialized when a first request that matches the particular combination of URLs and attributes is received. For example, suppose that proxy server 508 receives a very first request that specifies a particular URL and has a header that specifies the attributes of English as the language, desktop device as the client device type, Windows 10 as the operating system, and Google Chrome as the web browser type. Since this is the very first request with this particular combination of URL and attributes, the OTC service and the particular queue that corresponds to this request have never been set up yet (i.e., step 710 is determined as negative), and they need to be set up for the very first time. Process 700 proceeds to step 711. At step 711, since there is no prefetched response available yet from OTC service that can be served to the client immediately, the request is forwarded by proxy server 508 to origin server 510, and the response from origin server 510 will be forwarded by proxy server 508 to the client at a later time. Process 700 then proceeds to step 712 to set up the OTC service for the first time.

If the OTC service has already been set up (i.e., step 710 is determined as Yes), then process 700 proceeds to step 714.

At step 714, proxy server 508 communicates with OTC service 514 and determines whether there is an OTC cache hit for the received request. If there is a cache hit, then OTC service 514 returns a response that is retrieved from the appropriate OTC queue in OTC cache 518 to proxy server 508, and proxy server 508 forwards the retrieved response to the client without further delay. If there is a cache miss, then process 700 terminates, and the request is not processed further using OTC techniques. In particular, the request may be forwarded by proxy server 508 to origin server 510, and the response from origin server 510 will be forwarded by proxy server 508 to the client at a later time, bypassing OTC service.

Figure 8:
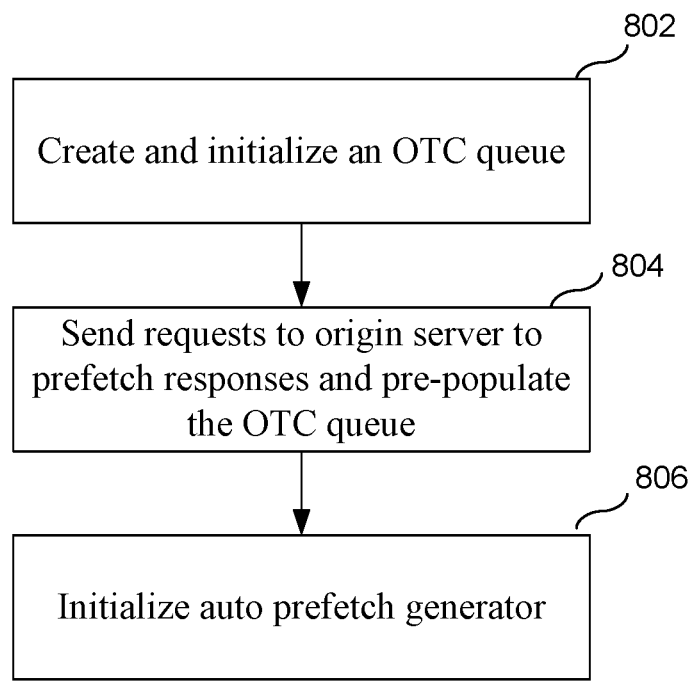
FIG. 8 illustrates an embodiment of a flow diagram of a process 800 for setting up OTC service for delivering dynamic content that corresponds to a particular combination of URL (uniform resource locator) and attributes.

FIG. 8 illustrates an embodiment of a flow diagram of a process 800 for setting up OTC service for delivering dynamic content that corresponds to a particular combination of URL and attributes. In some embodiments, process 800 is performed at step 712 of process 700 in FIG. 7. At step 802, OTC service 514 creates and initializes a queue in OTC cache 518 for storing dynamic content responses that correspond to the particular combination of URL and attributes. For some embodiments, the queue is a FIFO (First-in, First-out) queue. At step 804, OTC service 514 sends a plurality of requests to origin server 510 to prefetch a plurality of responses that fills up the OTC queue. For example, suppose that the queue has a length of N; then OTC service 514 may send N requests to origin server 510 to prefetch N responses that pre-populate the OTC queue. At step 806, OTC service 514 initializes automatic prefetch generator 520.

Figure 9:
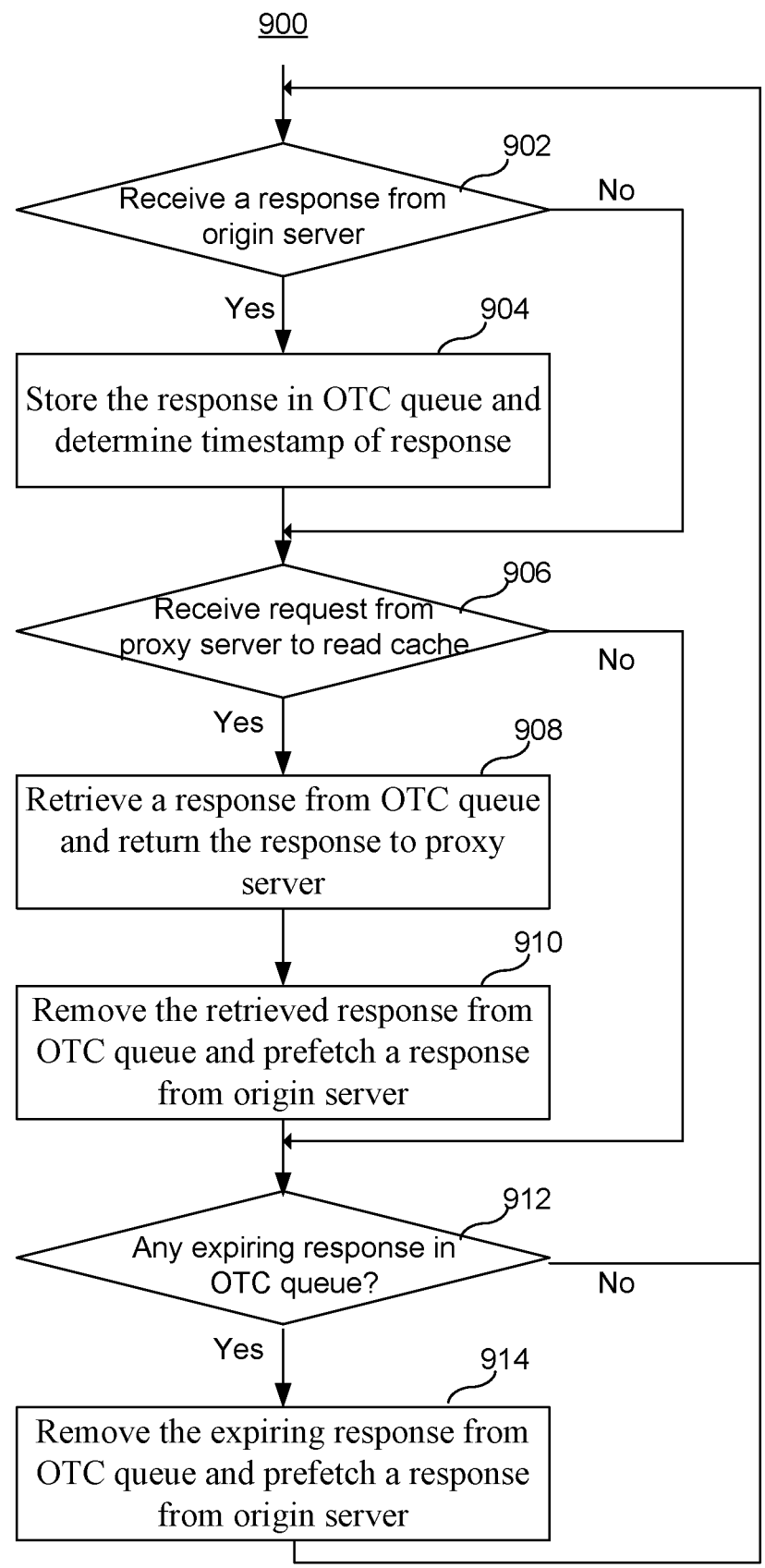
FIG. 9 illustrates an embodiment of a flow diagram of a process 900 for managing the OTC service for delivering dynamic content that corresponds to a particular combination of URL and attributes.

FIG. 9 illustrates an embodiment of a flow diagram of a process 900 for managing the OTC service for delivering dynamic content that corresponds to a particular combination of URL and attributes. In some embodiments, process 900 is performed in the background after the OTC service has been set up by process 800 in FIG. 8.

At 902, OTC service 514 determines whether a response from origin server 510 has been received. For example, the response may be triggered to be prefetched from origin server 510 by step 910 or step 914 (which will be described below) of process 900 to pre-populate the OTC queue. If a response is not received from origin server 510, then process 900 proceeds to step 906. Otherwise, the received response is stored in the OTC queue together with a timestamp for the stored response at step 904.

At step 906, OTC service 514 determines whether a request is received from proxy server 508 requesting to read the OTC queue in OTC cache 518. If a request is not received from proxy server 508 to read the OTC cache, then process 900 proceeds to step 912. Otherwise, OTC service 514 tries to retrieve a response from the OTC queue at step 908. If there is a cache hit, then the response is returned to proxy server 508; otherwise, OTC service 514 returns an indication to proxy server 508 that there has been a cache miss. At 910, OTC service 514 removes the retrieved response from the OTC queue. This is because each cached response stored in the OTC cache may only be sent once in response to a single request, unlike in regular caches, and is thereafter removed from the OTC cache. To replace the just removed response in the queue, OTC service 514 sends a request to prefetch another response from origin server 510. In some embodiments, OTC service 514 sends the prefetching request to origin server 510 directly. In some embodiments, OTC service 514 sends the prefetching request via proxy server 508. For example, OTC service 514 may send the prefetching request using a proxy client 522 that communicates with proxy server 508. When proxy server 508 receives the prefetching request from proxy client 522, proxy server 508 then forwards the prefetching request to origin server 510. Because origin server 510 receives the prefetching request from proxy server 510, the prefetched response is sent to proxy server 508 and not OTC service 514. One of the advantages of sending the prefetching request via proxy server 508 is that further optimization or processing by proxy server 508 on the received response can be performed before the response is sent back by proxy server 508 to proxy client 522 in OTC service 514. Processing by the proxy server 508 may include load balancing, billing, firewalls, and other optimizations.

At step 912, auto prefetch generator 520 determines whether there is any expiring response in the OTC queue. Because the responses in the OTC queue include dynamic content, the content may become stale after a period of time. Therefore, auto prefetch generator 520 is configured (e.g., in accordance with configuration by the web publisher) to keep the OTC cache warm by periodically removing stale responses and prefetching new responses to replace the stale removed responses in the queue. In some embodiments, auto prefetch generator 520 is configured to keep the OTC cache warm for up to a predetermined period (e.g., one hour) in the absence of real traffic. At step 912, if auto prefetch generator 520 determines that none of the responses in the OTC queue is expiring, then process 900 returns back to step 902, and process 900 is repeated for another cycle; otherwise, process 900 proceeds to step 914. At step 914, auto prefetch generator 520 removes the expiring response found in the queue. It further sends a request to prefetch another response from origin server 510 to replace the expiring response. In some embodiments, auto prefetch generator 520 sends the prefetching request to origin server 510 directly. In some embodiments, auto prefetch generator 520 sends the prefetching request to origin server indirectly through proxy client 522 and proxy server 508. For example, auto prefetch generator 520 may send the prefetching request using proxy client 522 that communicates with proxy server 508. When proxy server 508 receives the prefetching request from proxy client 522, proxy server 508 then forwards the prefetching request to origin server 510. Because origin server 510 receives the prefetching request from proxy server 510, the prefetched response is sent to proxy server 508 and not OTC service 514. One of the advantages of sending the prefetching request via proxy server 508 is that further optimization or processing by proxy server 508 on the received response can be performed before the response is sent back by proxy server 508 to proxy client 522 in OTC service 514. Processing by the proxy server 508 may include load balancing, billing, firewalls, and other optimizations. Because the processing by proxy server 508 is done prior to receiving the actual requests from the clients, there is no additional delay experienced by the client due to the processing.

In some embodiments, auto prefetch generator 520 determines whether a response is expiring based on a timestamp that records the time when the response in the queue was received and stored in the OTC cache. Auto prefetch generator 520 removes a response in the OTC queue if the timestamp shows that the response has been residing in the queue for a period above a predetermined threshold. In some embodiments, the default threshold may be two minutes to five minutes. In some embodiments, the web publisher is allowed to configure the predetermined threshold.

Since the prefetched responses may reside in the OTC queue for up to a few minutes, some embodiments utilize this idling time to further process the prefetched responses in the OTC queue for increased performance. For example, OTC service may be able to compress or transform some of the prefetched responses in the OTC queue using an algorithm that is more computationally expensive, but provides higher quality lossless compression/transformation or a higher compression ratio.

The length of an OTC queue is configurable. For example, the length of the queue may be five to ten. However, other lengths may be used as well. In some embodiments, the length of an OTC queue may be configurable by the web publisher's administrator. In some embodiments, the length of the queue may be determined by a proportional-integral-derivative (PID) controller. The length of the queue may be adapted based on different factors. For example, the length may be increased if the number of cache misses within a period (i.e., when the queue is empty) is beyond a certain threshold. In another example, the length may be decreased if the number of expiring responses removed by auto prefetch generator 520 within a time period is beyond a certain threshold.

As shown above, in some embodiments, OTC may be used to efficiently deliver dynamic non-personalized webpages that are sent in response to requests with exempted cookies by utilizing an exempted cookie whitelist at the proxy server. In other embodiments, instead of utilizing an exempted cookie whitelist at the proxy server, a virtualization client running at the client device is used to either remove an exempted cookie in a request or replace the cookie in the request with a special cookie (or a unique flag, marker, macro, or pattern) that the proxy server can understand and recognize, such that once the proxy server receives the request, the proxy server is triggered to deliver the response using similar OTC techniques described above.

For example, when a request that includes an exempted cookie is sent from a web browser, the virtualization client intercepts the request and replaces the cookie included in the request with a special cookie. For example, the original request may include A2=b2, and the modified request includes A3=b3. After the cookie in the request has been replaced by the special cookie, the request is sent to the proxy server. The proxy server may then trigger the OTC service and serve a response from the OTC cache to the web browser without further delay. When the virtualization client intercepts the response, the virtualization client then replaces the special cookie with the original cookie and sends the response to the web browser.

Referring back to FIG. 5, a virtualization client (also referred to as a nanovisor) may be installed on client device 502. Virtualization client 506 and proxy server 508 work together as a client-server system for virtualizing the DOM of a web browser. Virtualization of the DOM of a web browser allows the client-server system to take control of the DOM for different kinds of optimizations, while keeping the virtualization transparent to the web browser. A web browser accesses webpages and other information through a network. When a web browser sends any network messages onto the network that are related to the downloading of webpages or other information, the messages may either be intercepted and processed by virtualization client 506, or be directly received and processed by proxy server 508. Webpages or other information related to the webpages that are sent to web browser may be intercepted, filtered, processed, or provided by virtualization client 506 or proxy server 508. In addition, method API calls by a web browser or any JavaScript code which manipulate the objects in a DOM tree may be intercepted, processed, or modified by virtualization client 506. Virtualization client 506 may also manipulate the DOM tree by making the appropriate method API calls to the DOM tree. As a result, virtualization client 506 and proxy server 508 together create a virtualization engine for the DOM of a web browser. The virtualization engine may access and manipulate a DOM tree, including the creation, deletion, or update of nodes within the DOM tree.

Figure 10:
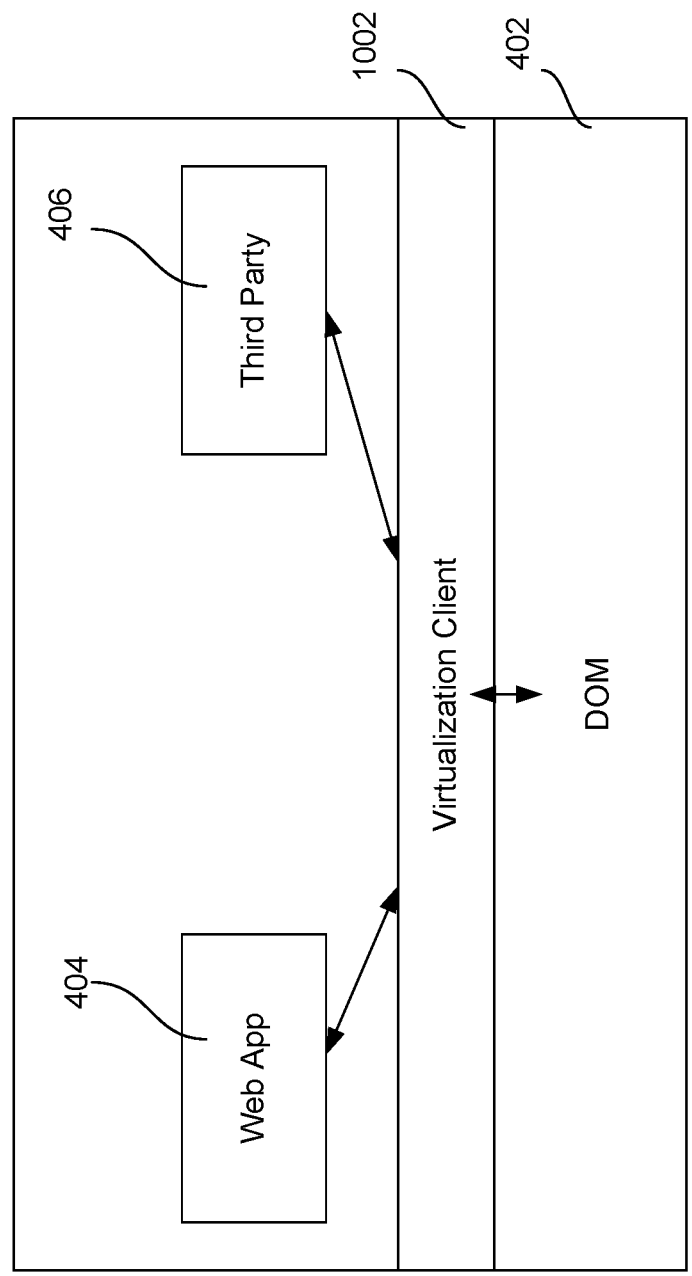
FIG. 10 illustrates a virtualization client above the DOM of a web browser.

FIG. 10 illustrates a virtualization client above the DOM of a web browser. Virtualization client 1002 may intercept the DOM APIs that pass information or instructions between the DOM 402 and different types of scripts. Virtualization client 1002 may supplant an intercepted DOM API with a new DOM API; for example, the new DOM API may selectively block the intercepted DOM API based on different criteria. The new DOM API may also modify the intercepted DOM API and pass a modified version of the intercepted DOM API to the DOM or the caller/user. The new DOM API may also trigger an alert in response to an intercepted DOM API.

In some embodiments, virtualization client 506 may be injected into web browser 504 based on standards-based (e.g., HTML or JavaScript) procedures. For example, virtualization client 506 may be injected by adding JavaScript client code (e.g., <script src="nanovisor.js"></script>) in the head section of a webpage.

In some embodiments, OTC may also be extended to efficiently deliver a dynamic page that includes both personalized and non-personalized content. When users access a particular URL, each user may obtain a webpage that contains some content that is identical for all users and other content that is unique to that user. For example, when a user accesses https://www.facebook.com or http://www.nytimes.com, the user may obtain a webpage that has non-personalized content and personalized content. Examples of non-personalized content include website logos, headline news, or weather forecasts; examples of personalized content include profile pictures of the user, welcome messages to the user, a personalized user timeline, or personalized advertisements.

Because proxy server 508 delivers webpages at any given URL to many users, proxy server 508 may analyze the webpages sent to different users over time and determine the portions of a webpage that include personalized content and the portions of the webpage that include non-personalized content. For example, machine learning may be used to detect and learn how the personalized content and the non-personalized content are being organized and displayed on the webpages that are sent to different users.

OTC techniques prefetch responses from origin server 510 and pre-populate OTC cache 518 with non-personalized content. To deliver dynamic webpages that include both personalized and non-personalized content using OTC techniques, the dynamic webpages may be prefetched and then transformed in such a way that they contain non-personalized content only. The advantage is that the non-personalized part of a webpage can be served immediately by proxy server 508 from OTC cache 518. The personalized content may then be subsequently obtained from origin server 510 and sent to client device 502. Once the personalized content is received at client device 502, the personalized content may be rendered and integrated with the previously received non-personalized content to form the complete original webpage.

In some embodiments, a webpage that includes both personalized and non-personalized content may be transformed by leaving the non-personalized content on the webpage in place and replacing the personalized content by embedding one or more macros that replace the personalized content. The macro may be one or more instructions that expand into a set of instructions to perform the task of retrieving the personalized content from a source, receiving the personalized content, and assembling the retrieved personalized content into the transformed webpage to form the original complete webpage. In some embodiments, the macro is a block of JavaScript that expands at client device 502 to perform the task of retrieving the personalized content from a source, receiving the personalized content, and patching the retrieved personalized content into the transformed webpage to form the original complete webpage. In some embodiments, the macro is a block of JavaScript that makes API calls that are provided by virtualization client 506. In some embodiments, the macro is a block of JavaScript that does not utilize virtualization client 506. In some embodiments, the macro may further include information regarding the source from which the personalized content is retrieved. Suppose proxy server 508 learns via machine learning that each webpage at a particular URL contains non-personalized content throughout the webpage, except for a single section marked by a HTML <div> tag (i.e., one section between <div> and </div>). The section marked by the <div> tag may include any types of personalized content, such as text, images, audio clips, and scripts. The webpages may be prefetched and each prefetched webpage is transformed by leaving the non-personalized content on the webpage in place and replacing the personalized content marked by the HTML <div> tag by one or more macros. When web browser 504 sends a request to proxy server 508, proxy server 508 may serve a transformed webpage immediately from OTC cache 518. When the transformed webpage reaches client device 502, the embedded macro then executes to fetch the personalized content from a source. The source may be proxy server 508. Proxy server 508 may retrieve the webpage for this user from origin server 510, parse the retrieved webpage for the section that contains the personalized content, and then return the section of content back to client device 502. The source may be origin server 510. The embedded macro may use a custom API provided by origin server 510 to retrieve the personalized section only. When the embedded macro receives the personalized section of the webpage, it may patch the received personalized section into the earlier received transformed webpage to form the original complete webpage.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of delivering dynamic web content, comprising:

prefetching by a proxy server from an origin server a plurality of responses to requests for dynamic web content at a URL (uniform resource locator) in advance of the proxy server receiving the requests, wherein each of the plurality of prefetched responses contains at least some non-personalized content;

caching by the proxy server the plurality of prefetched responses in a one-time cache, wherein each prefetched response cached in the one-time cache is served at most once and then removed from the one-time cache;

receiving by the proxy server a request from a client device for the dynamic web content at the URL;

serving by the proxy server to the client device one of the plurality of prefetched responses cached in the one-time cache, wherein the one of the plurality of prefetched responses is removed from the one-time cache after the one of the plurality of prefetched responses has been served;

fetching by the proxy server another response from the origin server;

parsing the fetched another response to obtain personalized content; and sending the personalized content to one or more macros in one of the prefetched responses previously served.

2. The method of claim 1, wherein each of the plurality of prefetched responses cached in the one-time cache contains only the non-personalized content.

3. The method of claim 1, further comprising:
determining whether the request received from the client device includes a cookie; and serving by the proxy server to the client device one of the plurality of prefetched responses cached in the one-time cache only when at least one condition out of a set of conditions is met, and wherein at least one condition is based on whether the request received from the client device includes a cookie.

4. The method of claim 3, wherein serving by the proxy server further comprises:
in the event that no condition out of the set of conditions is met, forwarding by the proxy server the request from the client device to the origin server, receiving by the proxy server a response from the origin server, and forwarding the response from the origin server to the client device.

5. The method of claim 3, wherein one condition out of the set of conditions is that the request received from the client device does not include a cookie and that a web publisher associated with the origin server has not indicated that the dynamic web content is personalized.

6. The method of claim 3, wherein one condition out of the set of conditions is that the request received from the client device includes a cookie and that the cookie matches a cookie on an exempted-cookie whitelist.

7. The method of claim 1, wherein the one-time cache comprises a plurality of queues for a particular URL, wherein each queue corresponds to a particular combination of URL and a plurality of client device attributes.

8. The method of claim 7, wherein a length of a queue is increased based on a number of cache misses within a first time period, and wherein the length is deceased based on a number of expiring responses within a second time period.

9. The method of claim 1, further comprising:
after the one of the plurality of prefetched responses is removed from the one-time cache, prefetching by the proxy server from the origin server another response; and caching the another response by the proxy server in the one-time cache.

10. The method of claim 1, further comprising:
determining whether a prefetched response cached in the one-time cache has expired based on how long the prefetched response has been stored in the one-time cache;

in the event that the prefetched response has expired, prefetching by the proxy server from the origin server another response and caching the another response by the proxy server in the one-time cache.

11. The method of claim 1, further comprising:
compressing or transforming at least one or more of the plurality of prefetched responses while the plurality of prefetched responses are residing in the one-time cache.

12. The method of claim 1, wherein the one or more macros use a custom API (application programming interface) provided by the origin server to fetch the personalized content.

13. The method of claim 1, wherein the one or more macros comprise JavaScript code.

14. A proxy server for delivering dynamic web content, comprising:
a processor; and
a memory coupled with the processor, wherein the memory is configured to provide the processor with instructions which when executed cause the processor to:
prefetch by a proxy server from an origin server a plurality of responses to requests for dynamic web content at a URL (uniform resource locator) in advance of the proxy server receiving the requests, wherein each of the plurality of prefetched responses contains at least some non-personalized content;

cache by the proxy server the plurality of prefetched responses in a one-time cache, wherein each prefetched response cached in the one-time cache is served at most once and then removed from the one-time cache;

receive by the proxy server a request from a client device for the dynamic web content at the URL;

serve by the proxy server to the client device one of the plurality of prefetched responses cached in the one-time cache, wherein the one of the plurality of prefetched responses is removed from the one-time cache after the one of the plurality of prefetched responses has been served;

fetch by the proxy server another response from the origin server;

parse the fetched another response to obtain personalized content; and send the personalized content to one or more macros in one of the prefetched responses previously served.

15. The system of claim 14, wherein each of the plurality of prefetched responses cached in the one-time cache contains only the non-personalized content.

16. The system of claim 14, wherein the memory is further configured to provide the processor with instructions which when executed cause the processor to:
determine whether the request received from the client device includes a cookie; and serve by the proxy server to the client device one of the plurality of prefetched responses cached in the one-time cache only when at least one condition out of a set of conditions is met, and wherein at least one condition is based on whether the request received from the client device includes a cookie.

17. The system of claim 16, wherein serving by the proxy server further comprises:
in the event that no condition out of the set of conditions is met, forwarding by the proxy server the request from the client device to the origin server, receiving by the proxy server a response from the origin server, and forwarding the response from the origin server to the client device.

18. The system of claim 16, wherein one condition out of the set of conditions is that the request received from the client device does not include a cookie and that a web publisher associated with the origin server has not indicated that the dynamic web content is personalized.

19. The system of claim 16, wherein one condition out of the set of conditions is that the request received from the client device includes a cookie and that the cookie matches a cookie on an exempted-cookie whitelist.

20. The system of claim 14, wherein the one-time cache comprises a plurality of queues for a particular URL, wherein each queue corresponds to a particular combination of URL and a plurality of client device attributes.

21. The system of claim 20, wherein a length of a queue is increased based on a number of cache misses within a first time period, and wherein the length is deceased based on a number of expiring responses within a second time period.

22. The system of claim 14, wherein the memory is further configured to provide the processor with instructions which when executed cause the processor to:
 after the one of the plurality of prefetched responses is removed from the one-time cache, prefetch by the proxy server from the origin server another response; and
 cache the another response by the proxy server in the one-time cache.

23. The system of claim 14, wherein the memory is further configured to provide the processor with instructions which when executed cause the processor to:
 determine whether a prefetched response cached in the one-time cache has expired based on how long the prefetched response has been stored in the one-time cache;
 in the event that the prefetched response has expired, prefetch by the proxy server from the origin server another response and cache the another response by the proxy server in the one-time cache.

24. The system of claim 14, wherein the memory is further configured to provide the processor with instructions which when executed cause the processor to:
 compress or transform at least one or more of the plurality of prefetched responses while the plurality of prefetched responses are residing in the one-time cache.

25. The system of claim 14, wherein the one or more macros use a custom API (application programming interface) provided by the origin server to fetch the personalized content.

26. The system of claim 14, wherein the one or more macros comprise JavaScript code.

27. A computer program product for delivering dynamic web content, the computer program product being embodied in a non-transitory computer readable storage medium and comprising computer instructions for:
 prefetching by a proxy server from an origin server a plurality of responses to requests for dynamic web content at a URL (uniform resource locator) in advance of the proxy server receiving the requests, wherein each of the plurality of prefetched responses contains at least some non-personalized content;
 caching by the proxy server the plurality of prefetched responses in a one-time cache, wherein each prefetched response cached in the one-time cache is served at most once and then removed from the one-time cache;
 receiving by the proxy server a request from a client device for the dynamic web content at the URL;
 serving by the proxy server to the client device one of the plurality of prefetched responses cached in the one-time cache, wherein the one of the plurality of prefetched responses is removed from the one-time cache after the one of the plurality of prefetched responses has been served;
 fetching by the proxy server another response from the origin server;
 parsing the fetched another response to obtain personalized content; and
 sending the personalized content to one or more macros in one of the prefetched responses previously served.

* * * * *